April 15, 1952     J. J. STRAND     2,592,832
VEGETABLE SLICER

Filed Oct. 23, 1948     2 SHEETS—SHEET 1

Inventor
John J. Strand
By Wooster & Davis Attorneys

April 15, 1952     J. J. STRAND     2,592,832
VEGETABLE SLICER
Filed Oct. 23, 1948     2 SHEETS—SHEET 2
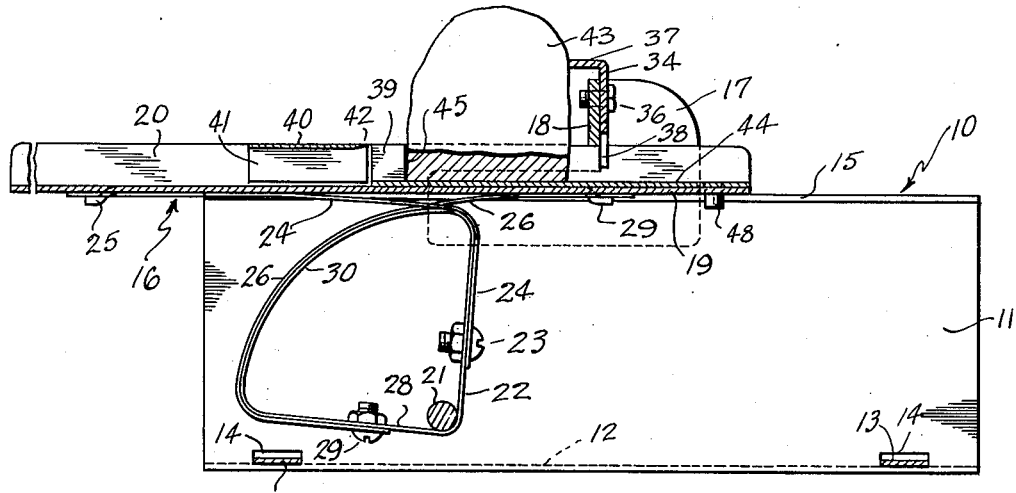
Fig. 3.
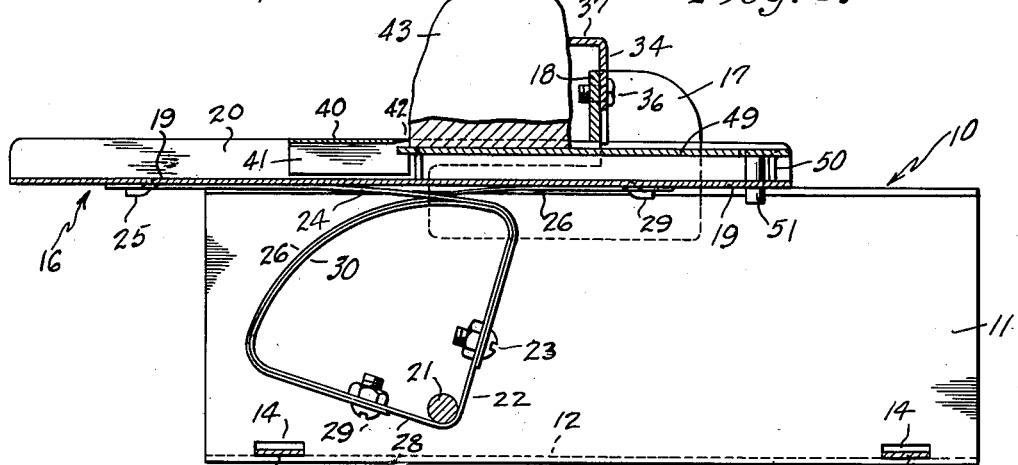
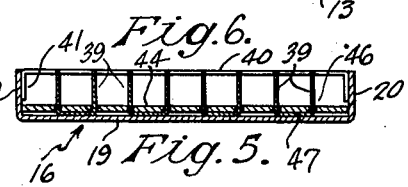
Fig. 6.
Fig. 5.
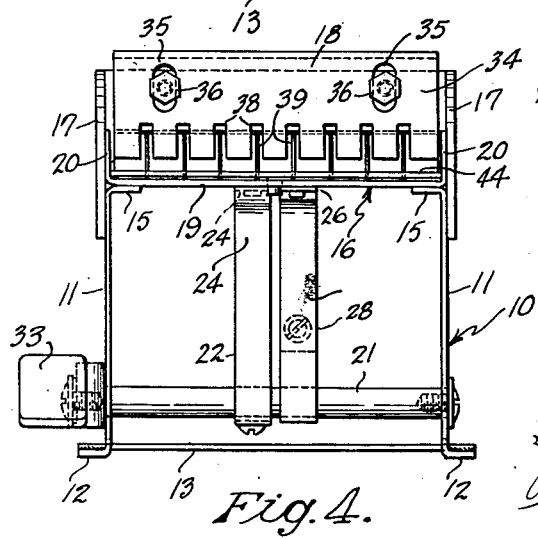
Fig. 4.
Inventor
John J. Strand
By Wooster Davis Attorneys Patented Apr. 15, 1952

2,592,832

UNITED STATES PATENT OFFICE 2,592,832

VEGETABLE SLICER

John J. Strand, Ansonia, Conn., assignor to The Strand Brothers Manufacturing Company, Incorporated, Derby, Conn., a corporation of Connecticut Application October 23, 1948, Serial No. 56,217

8 Claims. (Cl. 146—78)

This invention relates to a device for slicing vegetables, and has an for an object to provide a simple and effective device which may be manufactured and sold at relatively low cost for ordinary household use, and one which may be easily operated for the proper slicing of the vegetables.

Another object is to provide a structure which may be quickly and easily changed from an arrangement for slicing vegetables, such, for example, as a potato, in thin slices for making scalloped potatoes or potato chips, to an arrangement for slicing the potato or the like into squares or rectangular strips or sticks for French fried potatoes.

A further object is to provide a structure of this character which may be readily and easily cleaned.

Still another object is to provide an improved operating means for the reciprocating support for the vegetable which will provide a full and rapid movement with little effort on the part of the operator and thus provide easy and rapid operation.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 3 is a longitudinal vertical section substantially on the line 3—3 of Fig. 1;

Fig. 4 is an end view looking from the right of Figs. 1, 2 and 3;

Fig. 5 is a detail transverse section of the slide and slicing means of Figs. 1 to 3, and Fig. 6 is a longitudinal section similar to Fig. 3 showing the device arranged for slicing the vegetable in thin slices for making, for example, scalloped potatoes or potato chips.

Figure 1:
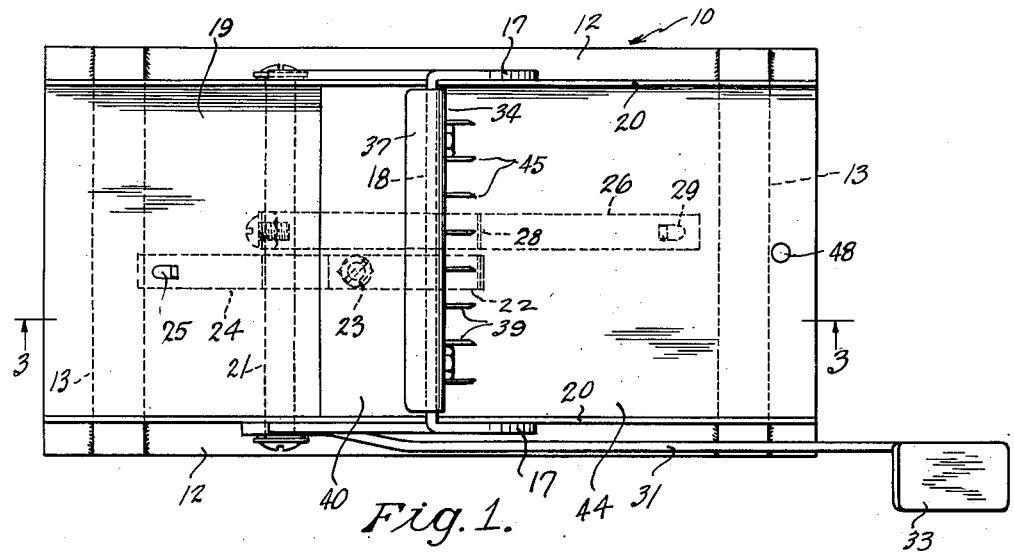
Fig. 1 is a top plan view of the device arranged for slicing the vegetable in square or rectangular slices, strips or sticks, such, for example, as slicing potatoes for French fries.

The device comprises a base or frame structure 10, preferably comprising upright sheet metal side members of suitable gauge or thickness required for the necessary strength and stiffness, and having laterally extending flanges 12 forming supporting feet for the frame and connected by laterally extending bars or straps 13 secured to the flanges 12 by any suitable means, preferably by passing them through openings or slots 14 in the side members and welding them to the tops of the flanges 12. At their upper edges the side members 11 are laterally bent inward as shown at 15 to provide supporting guides for a longitudinally reciprocating slide 16 which is retained against lateral movement on these guides by upright side plates 17 extending above the side plates 11 and secured thereto by welding or other suitable means, these plates being also connected by a transverse upright bar section 18 which may be an integral part of the plate 17. This structure holds the upper edges of the side plates in definite relation and adds strength and stiffness to the supporting base or frame.

Figure 2:
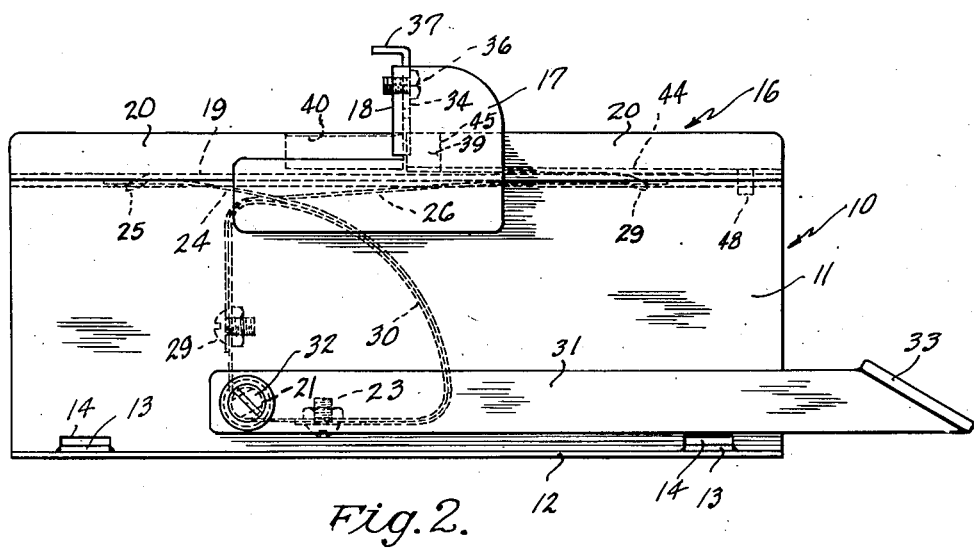
Fig. 2 is a side elevation looking toward the bottom of Fig. 1.

The slide 16 is preferably formed of proper gauge relatively heavy sheet metal, and includes a bottom plate 19 and upright side flanges 20 to guide it against the inner sides of the plates 17. It is reciprocated back and forth in a longitudinal direction by an improved form of operating means which is simple and effective in construction and which will reciprocate the slide in the slicing operation rapidly and with little effort on the part of the operator. This improved operating means is located in the base or frame 10 between the upright side members 11 and beneath the slide 16. It comprises a transverse shaft 21 mounted adjacent the lower edges of the side members 11 and supported in these members for turning movement. Mounted on this shaft by any suitable means, such as welding them to it, is one or more curved sectors 22. These may be a single sector of the proper width, or, as shown, may comprise two separate sectors, but the operation is the same in either case. Secured to one straight side of one sector by any suitable means, such as a bolt 23, is a flexible strap 24, secured at its other or free end to the bottom wall of the slide 16. It may be secured by any suitable means, but a simple and preferred construction is to lance and bend downwardly from this bottom wall a lug 25 with its free end extending away from the sector to form a hook over which the free end of the strap 24 may be hooked by means of a hole in the strap. This flexible strap is preferably a flat narrow strip of metal. A similar flexible strip 26 is fastened at 27 to the opposite straight side 28 of the other sector, and extended in the opposite direction and secured in the same manner by a similar hooked lug 29 lanced and bent downwardly from the bottom of the slide and facing in the opposite direction. Therefore, it will be evident that by turning the shaft 21 to oscillate or swing the sectors back and forth as viewed in Figs. 2, 3 and 6, these flexible straps 24 and 26 will reciprocate the slide 16 back and forth with a speed substantially equal to the speed of movement of the curved portions 30 of these sectors, and that the flexible straps will fold onto these curved portions as they move back and forth. The shaft may be operated by any suitable means, but a simple lever and handle arrangement has been found very effective. That shown comprises a simple lever 31 secured to one end of the shaft at 32 and extending beyond the rear end of the base portion and provided with a hand grip 33.

Mounted for vertical adjustment upon the upright bar 18 is an abutment or backing plate 34. This is preferably mounted on the rearside of the bar 18, and is provided with upright elongated slots 35 through which pass securing and clamping screws 36. By this means the plate 34 may be adjusted to different heights and readily clamped in any adjusted position. It is provided with a forwardly extending flange 37 at its top edge and in its lower edge is provided with a series of upright laterally spaced slots or notches 38 for passage of certain slicing blades 39, as will be later described.

Mounted on the slide 16 forwardly of the abutment plate 34 is a horizontal slicing blade 40. This blade is spaced above the bottom wall of the slide 16 and preferably mounted on the side flanges 20 of the slide to which it may be secured by downwardly extending end walls 41 and secured to the slide by any suitable means, such, for example, as welding or soldering, and is arranged with its cutting edge 42 facing toward the backing plate or abutment 34.

Associated with the slicing blade 40 is a gauge plate which also forms a support for the vegetable being sliced, a vegetable, such as a potato, being indicated at 43. When slicing the vegetable, such for example as a potato, into square or rectangular long pieces or sticks, as for example, when slicing for preparation of French fries, this gauge plate and support for the vegetable, as shown in Figs. 1 to 5, comprises a flat plate 44 supported by and resting on the bottom wall 19 of the slide 16, and at its rear edge or just below and immediately in front of the slicing blade 40, is provided with a series of laterally spaced upright knife blades 39. These are relatively narrow blades with their cutting edges formed on their upright edges 45, and they are spaced laterally across the plate 44 at the desired distance wanted for the width of the stick to be cut from the vegetable, their top edges preferably being substantially on the level of the slicing blade 40. These blades may be formed and secured to the plate 44 in any suitable manner, but in the structure shown they each comprise a flat strip of steel or any suitable material of proper thickness and bent up to substantially U-shape, as shown in Fig. 5, with the upright portions or legs of the U forming the blades 39 inserted through slots 46 in the plate 44 from the under side, and then the connecting bar 47 secured to this plate by any suitable means, such, for example, as soldering or welding. This is a very simple and effective means for forming these blades. In mounting this plate 44 and the knives 39 on the slide 16, it merely rests on the top of the bottom plate 19 of the slide between the side flanges 20, and it is held against longitudinal movement on the slide by means of a cooperating pin and opening on the plate and the slide. In the structure shown a pin 48 is secured to the plate 44 and extends downwardly therefrom adjacent its outer end and passes through an opening in the bottom wall 19 of the slide 16. No other attaching means is required and by such an arrangement the plate 44 is easily removed by merely lifting it from the slide, and it is as easily and quickly returned and mounted in the slide when desired. Plate 44 also forms a support or gauging plate for the vegetable indicated at 43 to determine the thickness of the strips or sticks cut from the vegetable, and it will be seen from Figs. 1 to 5 that on reciprocation of the slide 16 after placing the vegetable between the blades 39 and the backing plate 34, these knives 39 and also the slicing blade 40 will be forced through the vegetable, providing a series of laterally spaced upright cuts transversely through the lower portion of the vegetable formed by the blades 39, while the horizontal slicing blade 40 will cut a horizontal cut through the vegetable at the tops of these vertical cuts of a height depending on the distance of the plate 44 below the blade 40. Thus rectangular or square pieces or sticks are cut from the lower part of the vegetable and will pass out to the left under the slicing blade 40. As the upright blades 39 are in alignment with the slots 38 in the lower edge of the backing plate 34 they can pass into these slots without hitting the plate and will permit the cutting edge of the slicing blade 40 to pass entirely through the vegetable.

If it is desired to cut only thin slices from the vegetable, as, for example, in cutting slices for making scalloped potatoes or potato chips, the gauging plate supporting the vegetable is spaced higher above the bottom wall 19 of the slide 16. Such an arrangement is shown in Fig. 6, in which the gauging plate 49 is similar to the plate 44, except that it is not provided with the upright cutting blades 39 but is provided with lugs 50 on its under side supporting it at the proper distance above the bottom wall 19 of the slide so as to locate the top or supporting surface of this plate at a suitable distance below the cutting edge 42 of the slicing blade 40 and at the proper distance below this cutting edge, as indicated in Fig. 6, for the proper thickness of the thin slices to be cut from the vegetable. This operates the same as the first form to cut the thin slices from the bottom of the vegetable which slides pass to the left under the slicing blade 40. The supporting or spacing lugs 50 may be formed in any suitable way, but are preferably formed by lancing them from the plate 49 and bending them downwardly to the right angle position. Any suitable number may be provided, but it is preferred to have one adjacent each of the four corners of the plate. To hold the plate 40 against longitudinal movement on the bottom wall 19 of the slide, a pin 51 corresponding to the pin 48 is secured to the plate 49 and seats in the opening in wall 19. This plate may be easily and quickly removed the same as the plate 44 by merely lifting it from the slide and withdrawing the pin 51 from the opening in the slide, the same as in removing the plate 44. Either plate may be as easily and quickly mounted on the slide, depending on which type of slicing operation is intended to be performed.

This structure makes a very simple and effective device for performing these slicing operations, and one that may be very easily and quickly changed from one to the other by the housewife or anyone not familiar with mechanical devices, and the device is therefore particularly adapted for household use.

Having thus set forth the nature of my invention, I claim:

1. A vegetable slicer comprising a base frame including laterally spaced upright side members provided with guide means adjacent their upper edges, a vegetable supporting slide mounted for longitudinal reciprocating movement in said guide means, a transverse slicing blade carried by the slide for slicing the vegetables, an upright transverse abutment carried by the frame above the slide, to hold the vegetables while being sliced, a shaft below the slide and mounted in the side members, curved segment means carried by the shaft, flexible straps secured to the segment means to move alternately and simultaneously to and from a position on the curved portion of the segment means on oscillation of said means and extending in opposite directions therefrom and secured to the slide at their free ends on opposite sides of the shaft, and means for oscillating the shaft to reciprocate the slide.

2. A vegetable slicer comprising a base frame including laterally spaced upright side members provided with guide means adjacent their upper edges, a vegetable supporting slide mounted for longitudinal reciprocating movement in said guide means, vegetable slicing cutter means carried by the slide, an abutment forwardly of said cutter means cooperating therewith to hold a vegetable being sliced, a transverse shaft below the slide, sector means comprising curved outer rim surfaces mounted on the shaft, flexible bands secured one each to opposite sides of the sector means and extending over the curved surfaces in opposite directions and secured to the slide at their free ends on opposite sides of the shaft, and means for turning the shaft to reciprocate the slide.

3. In a vegetable slicer including a longitudinally reciprocable slide, a gauge plate forming a support for a vegetable to be sliced and provided with a series of laterally spaced slots adjacent one end, a series of substantially U-shaped blade members of which the laterally spaced legs form upright cutting blades, and said members being mounted on the under side of the plate with the legs extending upwardly through the slots from the lower side of the plate and with the connecting bar of the U-shaped member secured to the plate.

4. A vegetable slicer comprising a base frame provided with guide means, a slide mounted in the guide means for back and forth movement and including a bottom wall and upright longitudinal side flanges at its opposite edges, an upright backing plate above and extending transversely over the slide, a transverse horizontal slicing knife blade carried by the slide in front of the backing plate, an easily removable supporting plate for the vegetable to be sliced resting on and over said bottom wall in front of the knife blade between the side flanges and cooperating with the blade to determine the thickness of the slice, easily detachable cooperating means on the supporting plate and slide to cause the plate to move with the slide comprising a pin on the plate extending into an opening in the slide, said pin and opening comprising the sole means of securing the plate to the slide so that the plate may be removed by merely lifting it from the slide, and means for reciprocating the slide to slice a vegetable on the supporting plate.

5. A vegetable slicer comprising a base frame provided with guide means, a slide mounted in the guide means for back and forth movement and comprising a bottom plate, an upright backing plate above and extending transversely of the first plate, a transverse horizontal slicing blade mounted on the slide above the bottom plate, an easily removable gauging plate mounted on the bottom plate in front of the blade and providing a support for a vegetable to be sliced, a cooperating pin and opening on the bottom plate and gauge plate to cause the gauge plate to move with the slide and permit easy removal of the gauge plate, said pin and opening forming the sole means of securing the plate to the slide so that the plate may be removed by merely lifting it from the slide, a series of upright laterally spaced knife blades carried by the gauging plate below the slicing blade and secured to and removable with said gauging plate, and means for reciprocating the slide to slice a vegetable on the gauging plate.

6. A vegetable slicer comprising a base frame comprising laterally spaced upright sheet metal plates provided with inwardly directed flanges on their upper edges, a slide mounted for reciprocating movement on said flanges and including a bottom plate, upright guide plates mounted on the first plates and extending above said flanges providing guide means for the edges of the slide, a transverse horizontal slicing blade carried by the slide, a transverse bar connecting the guide plates over the slide, an upright transverse backing plate carried by the bar, means mounting said backing plate for vertical adjustment, a gauge plate mounted on the slide forwardly of the slicing blade forming a support for a vegetable to be sliced, and means for reciprocating the slide.

7. A vegetable slicer comprising a base frame including laterally spaced upright sheet metal side plates provided with supporting guides at their upper edges, a slide mounted on said guides comprising a bottom plate and upright side flanges at its opposite edges, a horizontal transverse slicing blade carried by the slide and spaced above the bottom plate, an upright transverse backing plate above the slide, an easily removable gauging plate carried by the slide between the side flanges in front of the slicing blade, said gauging plate providing a support for a vegetable to be sliced and provided with a series of upright laterally spaced cutting blades below the slicing blade secured to and removable with said plate, said gauging plate resting on the bottom plate of the slide and secured thereto by a pin on the gauge plate seated in an opening in the bottom plate, said pin and opening forming the sole means of securing the gauge plate to the bottom plate so that it may be removed by merely lifting it from the bottom plate, and means for reciprocating the slide.

8. A vegetable slicer comprising a base frame provided with guide means, a slide mounted for longitudinal reciprocating movement in said guide means and comprising a bottom plate, a horizontal transverse slicing blade carried by said slide spaced above the bottom plate, an easily removable gauging plate resting on the bottom plate forwardly of the slicing blade, means securing the gauging plate against longitudinal movement on the bottom plate comprising a pin on the first plate seated in an opening in the bottom plate, said pin and opening forming the sole means of securing the gauge plate to the bottom plate so it may be removed by merely lifting it from the bottom plate, said gauging plate forming a support for a vegetable to be sliced, a series of upright laterally spaced cutting blades carried by the gauging plate below and at the forward edge of the slicing plate and secured to and removable with the gauging plate, an upright transverse backing plate mounted for vertical adjustment above the slide and provided with a series of upright notches in its lower edge in alignment with the upright blades, and means for reciprocating the slide.

JOHN J. STRAND.

REFERENCES CITED

The following references are of record in the file of this patent:

UNITED STATES PATENTS

| Number | Name | Date |
| --- | --- | --- |
| 168,033 | Lohr | Sept. 21, 1875 |
| 352,451 | Cribb | Nov. 9, 1886 |
| 653,385 | Howell et al. | July 10, 1900 |
| 757,360 | Stevens | Apr. 12, 1904 |
| 901,624 | Krabill | Oct. 20, 1908 |
| 1,255,013 | Ireland | Jan. 29, 1918 |
| 1,397,469 | Vaughn | Nov. 15, 1921 |
| 1,827,977 | Erl | Oct. 20, 1931 |
| 2,274,626 | Van Berkel | Feb. 24, 1942 |